United States Patent [19]
Ploss et al.

[11] 3,851,541
[45] Dec. 3, 1974

[54] DIFFERENTIAL BALL NUT ASSEMBLY

[75] Inventors: Helmut Ploss, Wolfschlugen; Hans-Joachim Hildebrandt, Nurtingen-Oberensingen, both of Germany

[73] Assignee: Warner Electric Brake & Clutch Company, South Beloit, Ill.

[22] Filed: Nov. 15, 1973

[21] Appl. No.: 415,950

[52] U.S. Cl. .................................. 74/459, 74/441
[51] Int. Cl. ............................................ F16h 55/22
[58] Field of Search ................... 74/459, 424.8, 441

[56] References Cited
UNITED STATES PATENTS

| | | | |
|---|---|---|---|
| 1,153,861 | 9/1915 | Dudley et al. | 74/441 |
| 2,482,082 | 9/1949 | Wahlberg | 74/459 |
| 2,933,939 | 4/1960 | Brandt | 74/459 |
| 3,062,070 | 11/1962 | Baatty et al. | 74/459 |

Primary Examiner—Samuel Scott
Assistant Examiner—Wesley S. Ratliff, Jr.
Attorney, Agent, or Firm—Wolfe, Hubbard, Leydig, Voit & Osann, Ltd.

[57] ABSTRACT

Two ball nuts are preloaded onto a screw and may be selectively rotated through differential distances to enable the degree of preloading to be changed in small steps. The nuts are normally locked against relative rotation by a ring which permits differential rotation of the nuts without need of removing either nut from the screw.

9 Claims, 7 Drawing Figures

PATENTED DEC 3 1974 3,851,541

DIFFERENTIAL BALL NUT ASSEMBLY

BACKGROUND OF THE INVENTION

This invention relates to a ball nut assembly of the type in which two nut parts are adapted to be rotated relative to one another to preload the nuts to a predetermined degree on a ball screw, there being a connector extending between the nuts to prevent relative rotation of the nuts after the desired degree of preloading has been established. More particularly, the invention relates to a ball nut assembly in which the nuts are capable of being rotated through differential distances with respect to the connector and then anchored to the latter. With such an arrangement, the relative angular positions of the nuts may be changed in fine increments to enable the degree of preloading to be adjusted in small steps. Ball nut assemblies of this general type are disclosed in U.S. Pat. No. 2,933,941 and British Patent 1,140,381 and are frequently referred to as differential ball nut assemblies.

SUMMARY OF THE INVENTION

The general aim of the present invention is to provide a new and improved differential ball nut assembly of the above character in which the relative angular positions of the nuts may be changed in fine increments without need of removing the nuts from the ball screw.

In carrying out this aim, two rows of circumferentially spaced fastener-receiving recesses extend circumferentially with respect to the two nuts, the two rows being formed in either the nuts or the connector and there being a different number of recesses in the two rows. Two additional fastener-receiving recesses are positioned to register with the recesses in the two rows and, when releasable fasteners are inserted into the registering recesses, the nuts and the connector are anchored together and held against relative rotation. The fasteners are accessible from the outside of the nut assembly and, when removed from the recesses, permit relative rotation of the nuts to bring different ones of the recesses into register and enable fine relative adjustment of the nuts while the latter are still telescoped over the screw.

A further object of the invention is to provide a radially compact ball nut assembly by utilizing a connector in the form of a ring adapted to telescope into the nuts and thus avoid an increase in the diameter of the assembly.

The invention also resides in the unique arrangement of the fasteners and the recesses to facilitate manufacture, installation and adjustment of the assembly.

These and other objects and advantages of the invention will become more apparent from the following detailed description when taken in conjunction with the accompanying drawings.

DETAILED DESCRIPTION OF THE PREFERRED EMBODIMENT

Figure 1:
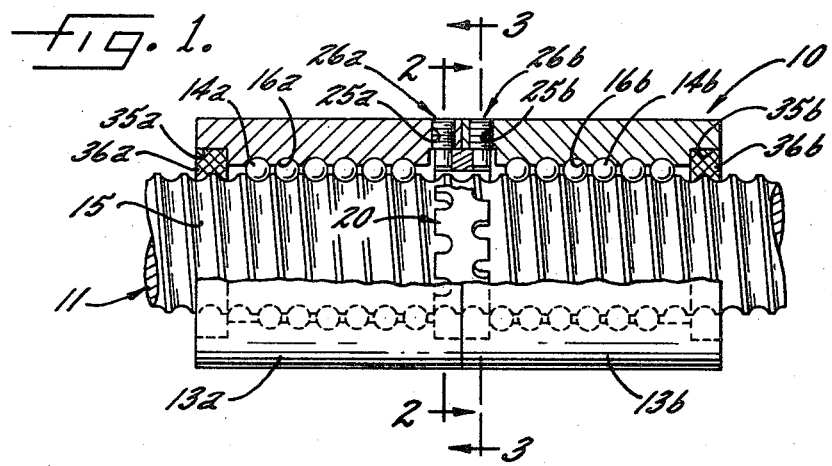
FIG. 1 is a fragmentary side elevation of a ball screw equipped with a new and improved ball nut assembly incorporating the novel features of the present invention, part of the nut assembly being broken away and shown in section.

As shown in the drawings for purposes of illustration, the invention is embodied in a ball nut assembly 10 which is telescoped over and movable both rotationally and linearly relative to a ball screw 11. The ball nut assembly comprises a pair of axially alined nuts parts 13a and 13b disposed in end-to-end engagement and supported on the screw by trains of balls 14a and 14b which circulate within a sprialed race 15 in the screw and similar races 16a and 16b in the nuts when the nuts are rotated relative to the screw. Each nut is provided with a suitable channel (not shown) connecting the ends of the respective nut race and defining a return path for the balls.

Figure 7:
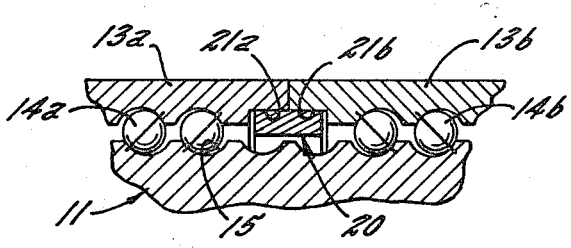
FIG. 7 is an enlarged view of parts shown in FIG. 1 and illustrating the preloading of the balls between the screw and the nuts.

To obtain high load-carrying capacity, the races 15 and 16 are formed with semi-circular profiles. The radius of the balls 14 is less than the radius of the races and, to take up the axial play or lash between the balls and the races, the two nuts 13a and 13b are rotated relative to each other and are locked in such positions as to cause the balls of the two nuts to contact opposite flanks of the races as shown in FIG. 7. In most cases, the balls are elastically deformed or preloaded within the races so as to bias the nuts toward each other and to maintain a lash-free condition when load is applied to the nut assembly. The degree of preloading depends upon the relative angular positions of the nuts and, as the balls and races wear, the relative angular positions of the nuts must be changed to maintain the same degree of preload.

In accordance with the present invention, the two nuts 13a and 13b are locked against relative rotation by a novel connector 20 which is uniquely constructed so that the nuts may be released from the connector 20 while still on the screw 11 and then rotated by differential amounts and re-locked to the connector. As a result, the relative angular positions of the nuts may be changed in small increments to enable fine adjustment of the preload and yet such adjustment may be effected without removing either nut from the screw.

More particularly, the connector 20 used in this specific instance is in the form of a ring which could be telescoped over the nuts 13a and 13b but which preferably is telescoped into the nuts so as to avoid increasing the diameter of the assembly 10. As shown in FIG. 7, the ring 20 spans the joint between the nuts and is received within counterbores 21a and 21b formed in the adjacent ends of the nuts. The ring preferably is formed from a single piece of metal and includes a left half or part 23a (FIG. 4) extending around the inside of the nut 13a and a right half or part 23b extending around the inside of the nut 13b.

Figures 4, 5, 6:
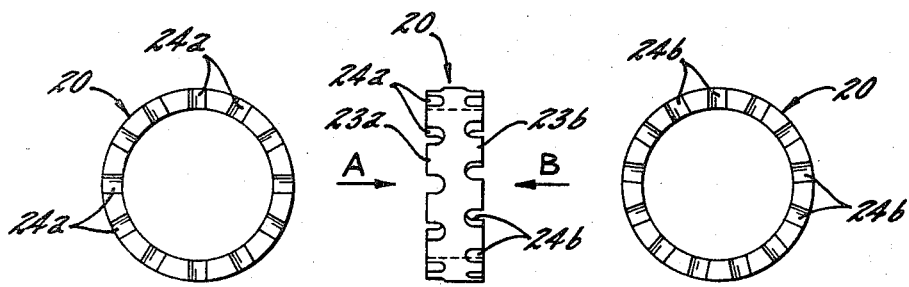
FIG. 4 is a side elevation of the connector ring.
FIGS. 5 and 6 are end views of the connector ring as seen in the directions of the arrows A and B, respectively, of FIG. 4.

In carrying out the invention, two rows of circumferentially spaced recesses 24a and 24b extend circumferentially around the nuts 13a and 13b, respectively, there being a different number of recesses in the two rows. While the recesses could be formed in the nuts, they preferably are formed in the ring 20 and preferably are defined by slots which open out of the axially facing ends of the ring. As shown in FIGS. 4 to 6, twelve slots 24a are formed through the left half 23a of the ring while thirteen slots 24b are formed through the right half 23b of the ring.

Figure 2:
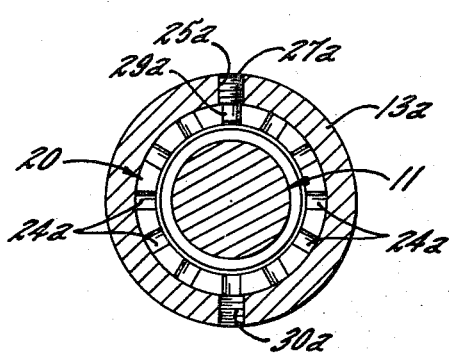
FIGS. 2 and 3 are cross-sections taken along the lines 2—2 and 3—3, respectively, of FIG. 1.
Figure 3:
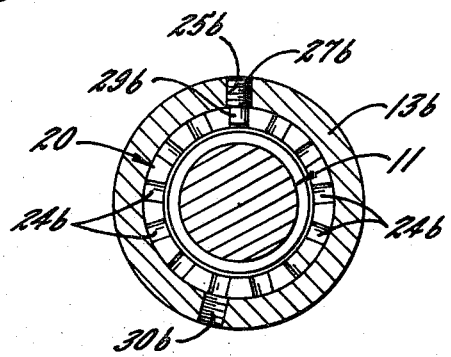

To enable the nuts 13a and 13b to be locked to the ring 20, recesses or holes 25a and 25b (FIGS. 1 to 3) are formed through the nuts 13a and 13b, respectively, and are adapted to receive fasteners 26a and 26b which enter the slots 24a and 24b. The holes 25a and 25b are located in axial alinement with the slots 24a and 24b so as to be capable of registering with different ones of the slots when the nuts are turned relative to the ring. Herein, the holes 25a and 25b extend radially through the nuts and are tapped in order to receive the fasteners 26a and 26b. The latter are in the form of dog-point set screws and are formed with threaded body portions 27a, 27b and reduced diameter tip portions 29a, 29b. The body portion of each screw is threaded into the respective hole 25 while the tip portion is received snugly in the underlying slot 24, the diameter of the tip portion corresponding substantially to the width of the slot. If desired, the nuts 13a and 13b may be formed with additional holes 30a and 30b (FIGS. 2 and 3) for receiving additional screws (not shown). The hole 30a is diametrically spaced from the hole 25a while the hole 30b is offset slightly from the diameter containing the hole 25b so that each hole may register with one of the slots.

With the foregoing arrangement, the degree of preload may be adjusted simply by removing the screws 26a and 26b from outside of the assembly 10 and by turning the nuts 13a and 13b relative to one another until the holes 25a and 25b register with different ones of the slots 24a and 24b. Thereafter, the screws are replaced to lock the nuts to the ring 20 and prevent relative rotation between the nuts. The adjustment of the preload may be preformed without removing the nuts from the screw 11 and thus it is a relatively simple matter to initially establish the preload or to reset the preload as wear occurs. The preload may be adjusted in small degrees since, with a ring having twelve and thirteen slots 24a and 24b, rotation of the nuts in the same direction and through distances equal to the pitch of the respective slots will produce relative angular displacement of only 1/156 part of the circumference of the nuts.

In addition to enabling easy adjustment of the preload, the ball nut assembly 10 with its internal connecting ring 20 is radially compact and is relatively simple in construction. It is necessary only to form one or two tapped holes 25a, 25b through each nut 13a and 13b and, with the open-ended slots 24a and 24b in the ring 20, manufacture and installation of the ring are simplified.

In the preferred embodiment of the invention, counterbores 35a and 35b (FIG. 1) identical to the counterbores 21a and 21b are formed in the outboard ends of the nuts 13a and 13b. Stripping rings 36a and 36b of felt or other like material are secured within the counterbores 35a and 35b and wipe grime from the screw 15 to prevent such grime from infiltrating the nuts. With each nut being formed with identical counterbores 21 and 35, the stripping ring can be fitted into either end of the nut and the holes 25 may be formed through the other end.

We claim as our invention:

1. A ball nut assembly comprising first and second axially alined nuts, a connector ring telescoped into said nuts and spanning the joint between the nuts, first and second axially spaced rows of circumferentially spaced recesses formed in said ring and located on opposite sides of said joint, there being a different number of recesses in said first row than in said second row, first and second tapped holes formed through said first and second nuts, respectively, and registerable with the recesses in the respective rows, and first and second screws threaded releasably into said first and second tapped holes, respectively, and tightly received in one of the recesses in the respective rows to prevent relative rotation between said nuts and said ring.

2. A ball nut assembly comprising first and second axially alined nut parts, a connector spanning the joint between said nut parts and having first and second rigidly joined parts facing said first and second nut parts, respectively, a first row of circumferentially spaced recesses formed in one of said first parts and extending circumferentially with respect to said first nut part, a first additional recess formed in the other of said first parts and registerable with the recesses in said first row, a second row of circumferentially spaced recesses formed in one of said second parts and extending circumferentially with respect to said second nut part, a second additional recess formed in the other of said second parts and registerable with the recesses in said second row, there being a different number of recesses in said first row than in said second row, first and second releasable fasteners accessible from the outer side of said assembly and releasably anchoring said first and second nuts, respectively, to said connector to prevent relative rotation between said nuts and said connector, said first fastener being inserted into registering ones of said first recesses and second fastener being inserted into registering ones of said second recesses.

3. A ball nut assembly as defined in claim 2 in which said connector is a ring which is telescoped with said nuts.

4. A ball nut assembly as defined in claim 3 in which said ring is telescoped into said nuts.

5. A ball nut assembly as defined in claim 4 in which said first and second rows of recesses are formed in said ring, said first and second additional recesses being formed through said first and second nuts, respectively.

6. A ball nut assembly as defined in claim 5 in which said fasteners comprise threaded screws, said first and second additional recesses being tapped to threadably receive said screws.

7. A ball nut assembly as defined in claim 5 in which said first and second rows of recesses are defined by first and second rows of angularly spaced slots formed through said ring, the slots of one row opening out of one end of the ring and the slots of the other row opening out of the other end of the ring.

8. A ball nut assembly as defined in claim 4 in which counterbores are formed in the adjacent ends of said nuts, said ring being telescoped into said counterbores.

9. A ball nut assembly as defined in claim 8 in which additional counterbores are formed in the outboard ends of said nuts, and stripping rings fitted into said additional counterbores for preventing grime from infiltrating into said nuts.

* * * * *